Sept. 3, 1963 J. A. SIRONS 3,102,920
LASER PUMPING TECHNIQUE USING AN INTERNAL PUMPING SOURCE
Filed Aug. 8, 1961 2 Sheets-Sheet 1

INVENTOR.
JANIS A. SIRONS
BY
ATTORNEY
AGENT

Sept. 3, 1963 J. A. SIRONS 3,102,920
LASER PUMPING TECHNIQUE USING AN INTERNAL PUMPING SOURCE
Filed Aug. 8, 1961 2 Sheets-Sheet 2
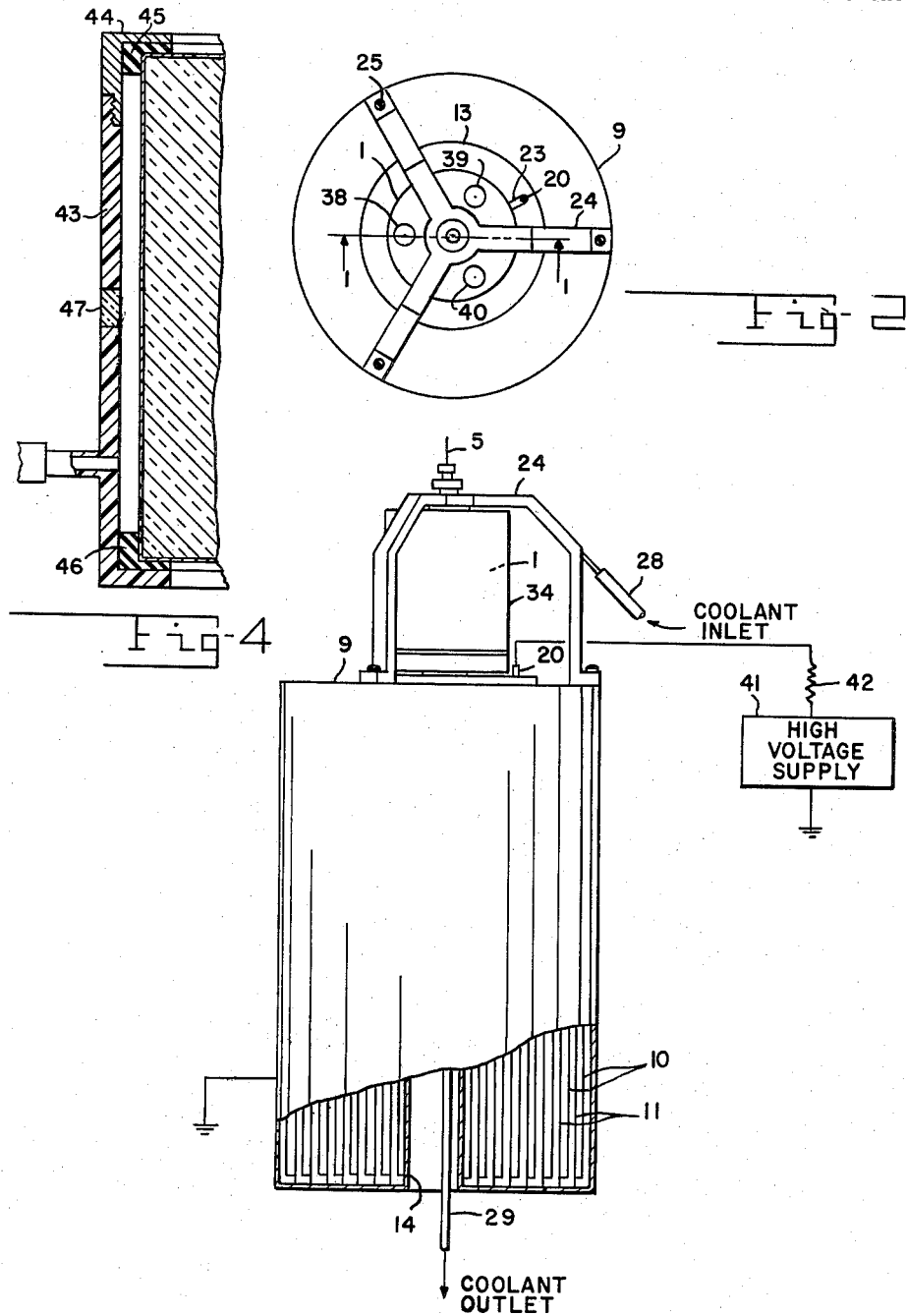
INVENTOR.
JANIS A. SIRONS
BY
ATTORNEY
AGENT

3,102,920
LASER PUMPING TECHNIQUE USING AN INTERNAL PUMPING SOURCE
Janis A. Sirons, Springfield, Ohio, assignor to the United States of America as represented by the Secretary of the Air Force
Filed Aug. 8, 1961, Ser. No. 130,201
10 Claims. (Cl. 88—1)
(Granted under Title 35, U.S. Code (1952), sec. 266)

The invention described herein may be manufactured and used by or for the United States Government for governmental purposes without payment to me of any royalty thereon.

This invention relates to lasers, or optical masers as they are sometimes called. The words "laser" and "maser" are acronyms for the phrases "light amplification by stimulated emission of radiation" and "microwave amplification by stimulated emission of radiation," respectively. This invention relates particularly to lasers utilizing a solid laser material, such as ruby, to produce a narrow beam of coherent light. Lasers of this type are useful in optical radar and navigational systems, the high degree of coherency of the light produced allowing the signal to be separated from the "noise," such as sunlight, by the use of narrow band optical filters, and the narrow beam permitting high resolution over great distances such as encountered in space.

The operation of a laser is based upon the fact that the atomic systems represented by the molecules of the laser material can exist in any of a series of discrete energy levels or states, the systems absorbing energy in the optical frequency range in going to a higher state and emitting it when going to a lower state. In the case of ruby, three energy levels are utilized. The atomic systems are raised from the lower or ground level to the higher of the three levels by irradiation from a strong light source which need not be coherent but should preferably have a high concentration of energy in the shorter wave-lengths. A radiationless transition then occurs from the highest state to an intermediate state. This is followed by a transition with photon emission from the intermediate state back to the ground state. It is the last transition that is of interest since this transition is the source of the coherent light produced by the laser.

The operation of raising the energy level of the laser to produce the desired photon emission is referred to in the art as "pumping." It is the primary object of the invention to provide an improved pumping technique having increased efficiency and an arrangement of parts that permits more effective cooling of the laser crystal. The improved cooling permits a higher pumping energy input and the increased efficiency insures that a greater part of the pumping energy goes into the emission of radiation by the crystal. The final result is a laser design of greatly increased coherent light output capabilities.

Heretofore pumping has been accomplished by a gas filled flash tube coiled around the laser crystal or otherwise positioned to concentrate its light output on the crystal. This method inherently requires that the crystal have a transparent outer surface with the result that light passes through the crystal and is lost rather than being constrained within the crystal for maximum transfer of pumping energy. In accordance with the invention the pumping radiation is provided by an electric arc or plasma located at the center of the crystal. This permits the outer surface of the crystal to be silvered so that the light is retained within the crystal where it undergoes multiple reflections from the reflective outer surface of the crystal. Since the light can not leave the crystal, all its energy is dissipated within the crystal either in raising the crystal molecules to higher energy states or in transmission and reflection losses. This results in a greater fraction of the pumping light energy being converted into photon emission than in previous pumping techniques and therefore a marked increase in pumping efficiency is realized.

The improved cooling of the laser crystal results from the fact that, with the pumping light source located at the center, a coolant may be brought into contact with the outer surface of the crystal. In order to cool the crystal in the vicinity of the high temperature plasma, coolant is passed through passageways in the electrode holders to fill and pass through the space in which the arc takes place.

A further advantage to be gained by the use of a plasma pumping light source lies in the extremely bright short duration light pulse that can be obtained by means of an arc. This is desirable from both the standpoint of pumping efficiency and the standpoint of waveshape of the coherent light output pulse of the laser. Further, because of the extremely high plasma temperature, the energy of the pumping light pulse is concentrated in the shorter wavelengths, i.e. the violet and ultraviolet bands, as required to stimulate photon emission in the visible spectrum.

A more detailed description of the invention will be given with reference to the specific embodiment thereof shown in the accompanying drawings in which—

FIGS. 2 and 3 are plan and elevation views respectively of the laser apparatus, and FIG. 4 shows a method of jacketing the laser crystal for cooling its exterior surface.

Figure 1:
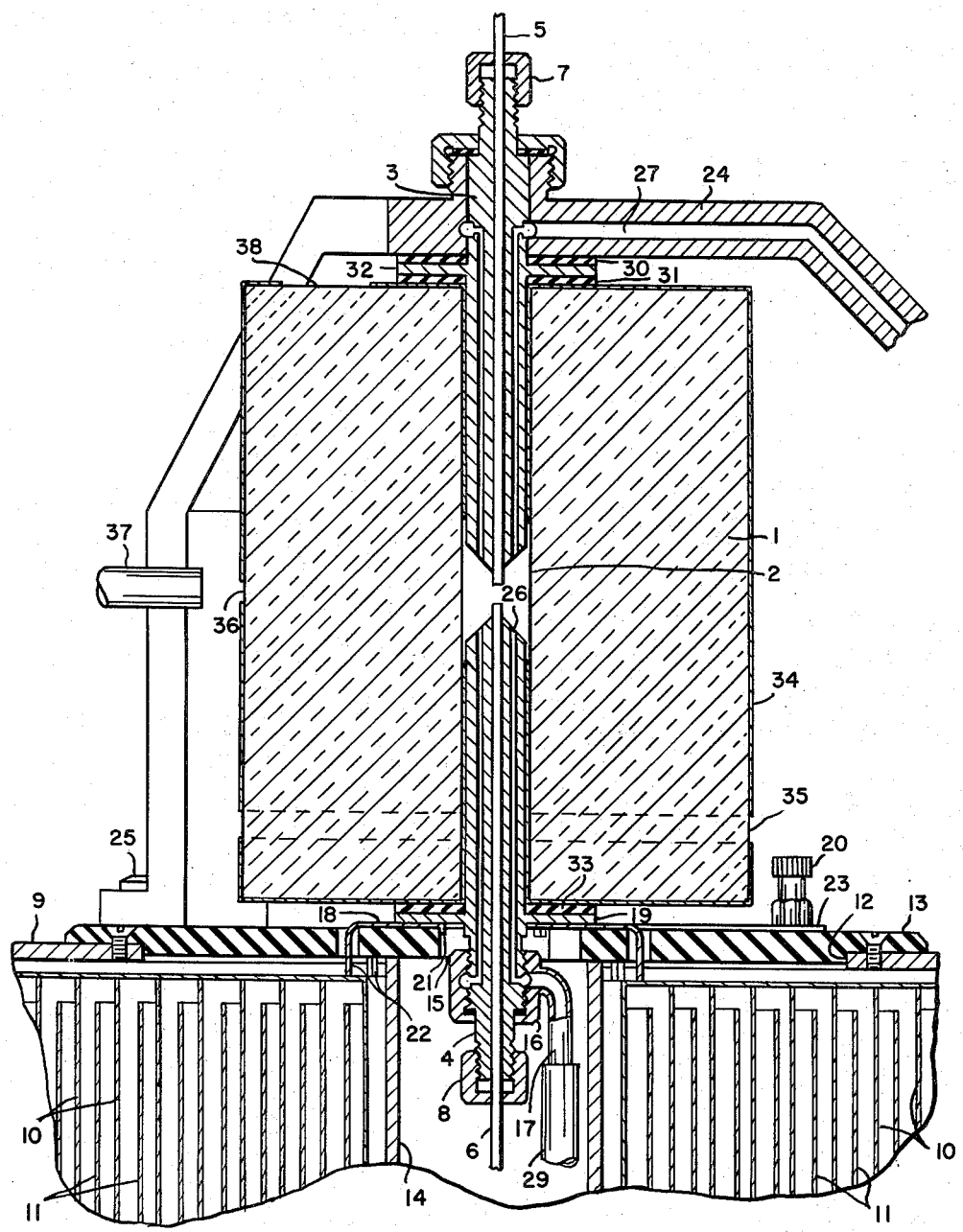
FIG. 1 is a sectional view of part of the laser apparatus taken along line 1—1 of FIG. 2.

Referring to FIGS. 1, 2 and 3, 1 is a cylindrically formed crystal of laser material such as ruby (chromium doped corundum), the best known laser material at the present time. The crystal has a cylindrical axial passageway 2 in which is located metallic electrode holders 3 and 4. The electrode holders have central passageways to receive electrodes 5 and 6. The electrodes may be locked in position in the holders by nuts 7 and 8 which have tapered threads to compress the split ends (not shown) of the holders.

The crystal rests atop a cylindrical metallic container 9 which houses a condenser for supplying the current for the arc that forms across the gap between the ends of electrodes 5 and 6. The cylindrical plates 10 are the high potential plates of the condenser and are insulated from the container 9. The plates 11 are the low potential plates and are connected to the container, i.e. they are grounded.

The upper end of container 9 has a large opening 12 which is covered by an insulating plate 13, the plate being supported at the edges by the top of container 9 and at the center by grounded metallic tube 14 which forms the inner wall of condenser housing 9. The plate 13 has a hole 15 at its center sufficiently large to pass threaded collar 16 and notched to pass tube 17. A metallic electrical contacting element 18 is situated between integral flange 19 of electrode holder 4 and insulating plate 13 and serves the dual functions of centering the electrode holder in opening 15 and of forming a common electrical connection between the electrode holder 4, the high potential plates 10 of the condenser and the high potential terminal 20. The element 18 is in the form of a disc having a diameter equal to that of flange 19 with a central opening closely fitting electrode holder 4, a plurality of bent down ears 21 for centering the holder in opening 15, a plurality of spring extensions 22 which are bent down and pass through holes in plate 13 to contact the condenser, and an integral strap 23 for connecting the element to terminal 20.

The laser crystal is held in alignment and against the face of plate 13 by means of a three-legged spider 24 which is fastened to the top of housing 9 as by screws 25.

The electrode holders 3 and 4 each have a plurality of coolant pasageways such as 26 surrounding the electrode passageway and parallel thereto. The coolant pasageways terminate in annular grooves which in combination with annular grooves in the spider 24 and threaded collar 16 form headers communicating with coolant passageway 27 in the spider and coolant tube 17 extending from collar 16. A coolant inlet hose 28 (FIG. 3) connects with passageway 27 and a coolant outlet hose 29 connects with tube 17. Gaskets 30 and 31, between integral flange 32 of electrode holder 3 and the spider 24 and the crystal 1, respectively, and gasket 33 between flange 19 and the crystal prevent coolant leaks at these points. The height of spider 24 is made such that these gaskets are slightly compressed when the spider is pulled down against the top of housing 9 by screws 25.

The laser crystal 1 has its outer surface covered with a 100% reflective coating 34 of silver or other reflective material with the exceptions that the coating is omitted on the surface of passageway 2 opposite the electrode gap to permit pumping light to enter the crystal, on the outer surface of the crystal along a band 35 to prevent short circuiting of the electrodes and at a small window 36 to permit viewing of the arc in the elctrode gap, as by a suitable optical instrument 37. In addition, the reflectivity of the coating is reduced slightly, for example to 98% reflecting and 2% transmitting, at three circular windows 38, 39 and 40 through which the coherent light generated by the laser emerges.

During operation a coolant liquid, such for example as clear mineral oil, is continuously supplied via the inlet and outlet ducts 27 and 17, the liquid completely filling the space surrounding the electrode gap. Electrical energy is applied to the system by connecting a high voltage source 41 and resistor 42 (FIG. 3) between terminal 20 and ground. Spider 24 provides a ground connection for the electrode in holder 3. The condenser charges through resistor 42 until its voltage exceeds the breakdown potential of the gap between the electrodes, whereupon the condenser discharges across the gap and the cycle repeats, the repetition rate being determined by the voltage of source 41, the size of the condenser, the gap spacing and the resistance of resistor 42. The electric arc in passing through the liquid coolant excites the molecules of the liquid to form a plasma of very high temperature. For gaps of one millimeter and greater and voltages from 10 to 60 kv., the internal temperature of the plasma may reach 1,000,000° C. Radiation reduces the outside temperature of the plasma to between 600° C. and 10,000° C., however, these temperatures give a block body radiation having most of its energy in the violet and ultraviolet region as required to produce laser action in the visible band. These temperatures may leave burned oil particles in the vicinity of the electrodes which, however, are carried away by the oil circulation, the circulation rate being adjusted to provide the proper cooling and to avoid blackening of the crystal walls.

It is desirable that the pumping light pulse be of high intensity and very short duration in order to obtain a single high intensity coherent light output pulse from the laser material. Pumping light pulses of relatively low intensity and long duration, as produced by flash tubes, result in a broader less intense output light pulse or else in a plurality of output pulses. In order to produce an intense plasma of short duration, rapid discharging of the condenser across the electrode gap is necessary. For this purpose specially designed low inductance condensers, such as those already employed in optical radar systems, should be used and the inductance in the circuit between the condenser and the gap should be reduced to the minimum as has been done in the design shown in FIG. 1. With arrangements of this type, discharge times of 0.1 to 1 $\mu$ sec. are obtainable with peak powers of 10,000 kw. or more supplied by the condenser.

The pumping light energy produced by the plasma does not leave the crystal because of the silver plating, but undergoes multiple reflection patterns between the silver plated walls thereby accomplishing multiple pumping runs. Since the light does not leave the crystal all its energy goes into molecular pumping or is dissipated in reflection and transmission losses. The generated coherent light energy which has its wavefront parallel to the end surfaces of the crystal develops a resonance effect, as in other lasers having silvered end surfaces, and emerges from the crystal through the 2% transparent windows 38, 39 and 40.

The coolant, such as the clear mineral oil already mentioned, passes continuously through and fills the space surrounding the electrode gap. This cools the crystal at the point of greatest heat generation. In many cases this will be sufficient. However, if additional crystal cooling is necessary the crystal may be fitted with a jacket, as partially shown in FIG. 4, and coolant passed continuously in contact with the outer surface of the crystal. Because of the high potential between the end surfaces of the crystal, the main body 43 of the jacket is preferably made of plastic. The end ring 44 may be made of metal threaded into the body portion. Gaskets 45 and 46 serve to center the jacket and prevent coolant leakage. Suitable inlet and outlet tubes are provided at the ends, preferably at diagonally opposite points. A transparent window 47 may be provided to permit observation of the arc.

The advantage of using a plasma as the source of pumping light resides in its extremely high brightness (watts/unit solid angle). Since it is not possible by optical means to obtain an image brightness higher than that of the source, the pumping light source must have the required brightness to activate the proper energy levels levels in the crystal. In this respect the plasma source is much superior to other sources such as gaseous discharge tubes. However, the invention is not limited to use with a plasma pumping light source but may employ any other source of pumping light, such as a gaseous discharge tube, located in the central passageway 2. In any case the advantage of maximum utilization of pumping light, which results from confining the pumping light within the crystal until its energy is dissipated, is retained with a resulting increase in pumping efficiency.

I claim:

1. A device for the production of coherent light comprising a body of a solid transparent material capable of the stimulated emission of optical radiation, a passageway through said body, a source of pumping light in said passageway, a coating producing total internal reflection of light over substantially the entire surface of said body including the surface of said passageway, except for that part of the passageway surface opposite said pumping light source which is left transparent to permit entry of pumping light into said body, and a partially transmitting partially internally reflecting window in said coating on an outer surface of said body through which the coherent light emerges.

2. A device for the production of coherent light comprising a body of a solid transparent material capable of the stimulated emission of optical radiation, a passageway through said body, means providing an electric arc in said passageway to serve as a source of pumping light, a coating producing total internal reflection of light over substantially the entire surface of said body including the surface of said passageway, except for that part of the passageway surface opposite said pumping light source which is left transparent to permit entry of pumping light into said body, and a partially transmitting partially internally reflecting window in said coating on an outer surface of said body through which the coherent light emerges.

3. In combination with the apparatus of claim 2, means for passing a coolant through said passageway.

4. A device for the production of coherent light comprising a body of a solid transparent material capable of the stimulated emission of optical radiation, said body having two spaced parallel end surfaces, a passageway through said body having an axis normal to said end surfaces, a source of pumping light in said passageway, a coating producing total internal reflection of light over substantially the entire surface of said body including the surface of said passageway, except for that part of the passageway surface opposite said pumping light source which is left transparent to permit entry of pumping light into said body, and a partially transmitting partially internally reflecting window in said coating on one of said end surfaces through which the coherent light emerges.

5. A device for the production of coherent light comprising a body of a solid transparent material capable of the stimulated emission of optical radiation, said body having two spaced parallel end surfaces, a passageway through said body having an axis normal to said end surfaces, an electrode holder extending into said passageway from each end surface with the inner ends of the electrode holders in spaced opposition, a rod-like electrode occupying an axial position in each electrode holder, said electrodes extending beyond the inner ends of said electrode holders and having their ends in relatively closely spaced opposition to form a discharge gap, means for producing an electrical discharge across said gap, a coating producing total internal reflection of light over substantially the entire surface of said body including the surface of said passageway, except for that part of the passageway surface opposite said gap which is left transparent, and a partially transmitting partially internally reflecting window in the coating on one of said end surfaces through which the coherent light emerges.

6. A device for the production of coherent light comprising a body of a solid transparent material capable of the stimulated emission of optical radiation, said body having two spaced parallel end surfaces, a passageway through said body having an axis normal to said end surfaces, an electrode holder extending into said passageway from each end surface with the inner ends of the electrode holders in spaced opposition, a rod-like electrode occupying an axial position in each electrode holder, said electrodes extending beyond the inner ends of said electrode holders and having their ends in relatively closely spaced opposition to form a discharge gap, each of said electrode holders having a plurality of passageways situated around and parallel to the electrode and extending to the inner end of the holder, means for continuously passing a liquid coolant through said passageways whereby the coolant continuously fills and passes through the space between the ends of said electrode holders including said gap, means for producing an electrical discharge across said gap, a coating producing total internal reflection of light over substantially the entire surface of said body including the surface of said passageway, except for that part of the passageway surface opposite said gap which is left transparent, and a partially transmitting partially internally reflecting window in the coating on one of said end surfaces through which the coherent light emerges.

7. Apparatus as claimed in claim 5 in which said means for producing an electrical discharge across said gap comprises a high capacity low inductance condenser connected by low inductive means between said electrode holders, and a high voltage charging circuit connected across said condenser.

8. A device for the production of coherent light comprising a body of a solid transparent material capable of the stimulated emission of optical radiation, said body being cylindrical in form with end faces normal to the axis, an axial cylindrical passageway through said body, a source of pumping light in said passageway, a coating producing total internal reflection of light over substantially the entire surface of said body including the surface of said passageway, except for that part of the passageway surface opposite said pumping light source which is left transparent to permit entry of pumping light into said body, and a partially transmitting partially internally reflecting window in said coating on one end face through which the coherent light emerges.

9. A device for the production of coherent light comprising a body of a solid transparent material capable of the stimulated emission of optical radiation, said body being cylindrical in form with end faces normal to the axis, an axial cylindrical passageway through said body, a cylindrical electrode holder of substantially the same diameter as said passageway extending into said passageway from each end face, the inner ends of the electrode holders being in spaced opposition, a rod-like electrode occupying an axial position in each electrode holder, said electrodes extending beyond the inner ends of said electrode holders and having their ends in relatively closely spaced opposition to form a discharge gap, each of said electrode holders having a plurality of coolant passageways situated around and parallel to the electrode and extending to the inner end of the holder, a coolant inlet connection to the passageways of one electrode holder at its outer end and a coolant outlet connection to the passageways of the other electrode holder at its outer end whereby a liquid coolant may be passed through said passageways to continuously fill and pass through the space between the ends of said electrode holders including said gap, a high capacitance low inductance condenser connected between said electrode holders by low inductance low resistance means, a charging circuit connected across said condenser, a coating producing total internal reflection of light over substantially the entire surface of said body including the surface of said passageway, except for that part of the passageway surface opposite said gap, and a partially transmitting partially reflecting window in said coating on one end face through which the coherent light emerges.

10. Apparatus as claimed in claim 9 in which the cylindrical surface of said body is jacketed and provided with inlet and outlet ports to permit the passage of a coolant over and in contact with said cylindrical surface.

No references cited.